United States Patent
Planche et al.

(10) Patent No.: US 6,852,779 B1
(45) Date of Patent: Feb. 8, 2005

(54) METHOD FOR THE PRODUCTION OF CROSS-LINKED AND/OR FUNCTIONALIZED BITUMEN/POLYMER COMPOSITIONS AND USE OF SAID COMPOSITIONS IN COVERINGS

(75) Inventors: Jean-Pascal Planche, Saint Just-Chaleyssin (FR); Patrick Turello, Francheville (FR); Pierre Chaverot, Saint-Martin la Plaine (FR); Patrice Vegny, Ternay (FR)

(73) Assignee: ELF Antar France, Courbevoie (FR)

( * ) Notice: Subject to any disclaimer, the term of this patent is extended or adjusted under 35 U.S.C. 154(b) by 0 days.

(21) Appl. No.: 10/018,790

(22) PCT Filed: Jun. 21, 2000

(86) PCT No.: PCT/FR00/01711
§ 371 (c)(1),
(2), (4) Date: Oct. 1, 2002

(87) PCT Pub. No.: WO00/78870
PCT Pub. Date: Dec. 28, 2000

(30) Foreign Application Priority Data

Jun. 22, 1999 (FR) .............................. 99 07914

(51) Int. Cl.$^7$ .............................. C08L 95/00
(52) U.S. Cl. .............................. 524/68; 524/71
(58) Field of Search ............... 524/68, 70–71

(56) References Cited

U.S. PATENT DOCUMENTS

| | | | |
|---|---|---|---|
| 5,189,083 A | * | 2/1993 | Gelles et al. ............... 524/68 |
| 5,278,207 A | * | 1/1994 | Kluttz ....................... 524/68 |
| 5,288,773 A | | 2/1994 | Gorbaty et al. |
| 5,336,705 A | | 8/1994 | Gorbaty et al. |
| 5,348,994 A | | 9/1994 | Gorbaty et al. |
| 5,605,946 A | | 2/1997 | Planche et al. |
| 5,874,492 A | | 2/1999 | Planche et al. |
| 5,880,185 A | | 3/1999 | Planche et al. |
| 6,020,404 A | | 2/2000 | Planche et al. |

FOREIGN PATENT DOCUMENTS

| | | |
|---|---|---|
| EP | 0559462 A1 | 9/1993 |
| FR | 2 739 863 A | 4/1997 |
| FR | 9-95616 | 8/1997 |
| WO | WO 93 18092 A | 9/1993 |
| WO | WO 97 43341 A | 11/1997 |

* cited by examiner

*Primary Examiner*—Peter Szekely
(74) *Attorney, Agent, or Firm*—Sughrue Mion, PLLC

(57) ABSTRACT

Compositions produced by forming a homogenous mass consisting of a bitumen matrix wherein a cross-linked and/or functionalized elastomer produced in situ from a precursor elastomer is dispersed in a uniform manner and makes up 0.5–30% of the weight of the bitumen matrix. The bitumen matrix is created by associating 95%–20 wt. % non oxidized bitumen having a penetrability of 20–900 and 5–80 wt. % oxidized bitumen having a penetrability of 10–90. The compositions can be used as bitumen binders in the production of coverings.

30 Claims, No Drawings

METHOD FOR THE PRODUCTION OF CROSS-LINKED AND/OR FUNCTIONALIZED BITUMEN/POLYMER COMPOSITIONS AND USE OF SAID COMPOSITIONS IN COVERINGS

The invention relates to a method for preparing cross-linked and/or functionalized bitumen/polymer compositions with a very low susceptibility to temperature. It also relates to the application of said compositions in the making of pavements and, in particular, road surface treatments, coated materials or watertight facings.

We know of the use of bituminous compositions as various top courses and in particular as roadway surface sealing coats provided said compositions have a certain number of essential mechanical characteristics.

These mechanical qualities are valued, in practice, by determining, through standardized tests, a series of mechanical properties, of which the most used are as follows:
- softening point, expressed in ° C. and determined by the Ring and Ball test defined by the NF standard T 66008,
- brittleness point, or Fraas point, expressed in ° C. and determined according to the IP standard 80/53,
- penetrability, expressed in ¹⁄₁₀ of a mm and determined according to the NF standard T 66004,
- tensile rheological characteristics determined according to the NF standard T 46002 and in the following quantities:
- yield stress $\sigma_s$ in MPa,
- elongation at yield $\epsilon_s$ in %,
- breaking stress $\sigma_r$ in MPa,
- elongation at break $\epsilon_r$ in %.

We can also obtain an indication of the susceptibility to temperature of bituminous compositions from a correlation between the penetrability (abbreviated pen) and the softening point (abbreviated RBT) of said compositions, known under the name PFEIFFER number (abbreviated PN).

This number is calculated using the formula:

$$PN = \frac{20 - 500 A}{1 + 50 A}$$

where $A$ is the slope of a straight line represented by the equation:

$$A = \frac{\log_{10} 800 - \log_{10} pen}{RBT - 25}$$

The bituminous composition's susceptibility to temperature is all the more brittle as the value of the PFEIFFER number is large, or, as the value of the quantity A is smaller, which is the same thing. For refinery bitumens, the PFEIFFER number takes on negative values.

In general, traditional bitumens do not have all the required qualities at the same time and we have known for a long time that by adding various polymers to said traditional bitumens we are able to favorably modify the mechanical properties of the latter and create bitumen/polymer compositions with improved mechanical qualities compared to those of the bitumens alone.

The polymers that are likely to be added to the bitumens are most often elastomers such as polyisoprene, butyl rubber, polybutene, polyisobutene, ethylene vinyl acetate copolymers, polymethacrylates, polychloroprene, ethylene propylene copolymers, ethylene propylene diene terpolymers (EPDM), polynorbornene or alternatively random or block copolymers of styrene and of a conjugated diene.

Among the polymers added to the bitumens, the random or block copolymers of styrene and of conjugated diene and alternatively of styrene and of butadiene are particularly efficient as they dissolve easily in the bitumens and provide them with excellent mechanical and dynamic properties and namely very good viscoelasticity properties.

We also know that the stability of bitumen/polymer compositions in which the polymer added to the bitumen is an elastomer, namely a copolymer of styrene and of conjugated diene such as butadiene, can be improved by reactions, done in situ, of chemical coupling of the polymer with the bitumen, using a sulfur donor coupling agent (FR-A-2376188, FR-A-2429241, FR-A-2528439 and EP-A-360656), or of functionalization of the polymer using a functionalization agent of the acid or carboxylic ester type with thiol or disulfide groups (WO-A-9714754) or of the thiolcarboxylic acid polyester type (WO-A-9847967).

We have now found that we can still improve some mechanical and rheological properties, namely consistency and tensile mechanical properties, and reduce the susceptibility to temperature of bitumen/polymer compositions, called cross-linked and/or functionalized bitumen/polymer compositions, obtained from the reaction of the chemical coupling of the polymer and the bitumen and/or of the functionalization of the polymer, when the bitumen used in the preparation of the cross-linked and/or functionalized bitumen/polymer composition contained an appropriate quantity of oxidized bitumen.

Therefore the invention relates to a method for preparing cross-linked and/or functionalized bitumen/polymer compositions with a very low susceptibility to temperature, wherein, when operating at temperatures that range between 100° C. and 230° C., preferably between 130° C. and 200° C., and when stirred, we form a homogenous mass that represents the bitumen/polymer composition and is made of a bituminous matrix wherein is evenly dispersed a cross-linked and/or functionalized elastomer, made from a precursor elastomer in a quantity ranging between 0.5% and 30% and more specifically between 1.5% and 20% of the weight of the bituminous matrix, where said method is characterized in that we make the bituminous matrix by associating, by weight, x% of a non oxidized bitumen, with a penetrability ranging between 20 and 900 and y% of an oxidized bitumen, with a penetrability that ranges between 10 and 90, where said penetrabilities are determined based on the NF standard T 66004 and expressed in ¹⁄₁₀ of a mm, where x and y are such that 20≦x≦95 and 5≦y≦80 with x+y=100.

Advantageously, the percentages by weight x% of non oxidized bitumen and y% of oxidized bitumen, associated to form the bituminous matrix of the bitumen/polymer composition, are such that 35≦x≦85 and 15≦y≦65 with x+y=100.

The non oxidized bitumen, used to form part of the bitumen matrix, consists of one single bitumen or a mixture of bitumens advantageously taken from among straight-run bitumen, refinery bitumens under reduced pressure, propane or pentane deasphalting residue and viscosity breaking residue. More specifically, the non oxidized bitumen is a bitumen or a mixture of bitumens taken from among straight-run bitumens.

The oxidized bitumen, used to form the other part of the bituminous matrix, consists of one single oxidized bitumen or of a mixture of oxidized bitumens advantageously chosen from among blown bitumens and semi-blown bitumens.

Advantageously, the penetrability of the non oxidized bitumen that is part of the bituminous matrix composition ranges between 35 and 500 and especially between 160 and 330. Whereas the penetrability of the oxidized bitumen, associated to the non oxidized bitumen to form said matrix, it ranges more specifically between 20 and 60.

According to a preferred method of execution, the oxidized bitumen used in making the bituminous matrix has a ring and ball softening point, defined as set forth in the NF standard T 66008, ranging between 60° C. and 120° C.

The cross-linked and/or functionalized elastomer, present in the bitumen/polymer composition generated by the method as set forth in the invention, is created by cross-linking and/or functionalization of a precursor elastomer such as polyisoprene, polynorbornene, polybutadiene, butyl rubber, ethylene propylene diene terpolynier (EPDM). Advantageously, the precursor elastomer consists of at least one copolymer chosen from among the random or block copolymers of styrene and of a conjugated diene such as butadiene, isoprene, chloroprene, carboxylic butadiene or carboxylic isoprene. More specifically, the precursor elastomer consists of one or several copolymers chosen from among the linear or star block copolymers, with or without a random hinge, of styrene and of butadiene, of styrene and of isoprene, of styrene and of chloroprene, of styrene and of carboxylic butadiene or alternatively of styrene and of carboxylic isoprene. The precursor copolymers of styrene and of conjugated diene, and in particular each of the afore-mentioned copolymers, advantageously have a styrene content that ranges between 5% and 50% by weight. These copolymers of styrene and of conjugated diene, and namely the above-mentioned copolymers, have, prior to cross-linking and/or functionalization, average molecular masses by weight that range, for example, between 10 000 daltons and 600 000 daltons and preferably between 30 000 daltons and 400 000 daltons. Preferably, the precursor copolymers of styrene and of conjugated diene are chosen from among the di or triblock copolymers of styrene and of butadiene, of styrene and of isoprene, of styrene and of carboxylic butadiene or alternatively of styrene and of carboxylic isoprene, whose average molecular masses by weight and styrene weight content fall within the previously defined ranges.

The cross-linked and/or functionalized elastomer present in the bitumen/polymer composition prepared using the method as set forth in the invention, in particular one or the other of the cross-linked and/or functionalized elastomers generated by cross-linking and/or functionalization of the afore-mentioned precursor elastomers, can result, for example, from the sulfur cross-linking of the precursor elastomer and/or a functionalization of said precursor elastomer.

According to a first form of implementation, the method for preparing cross-linked and/or functionalized bitumen/polymer compositions consists in putting the non oxidized bitumen and the oxidized bitumen chosen to make the bituminous matrix in contact with, by weight of said matrix, 0.5% to 30% and preferably 1.5% to 20% of a precursor elastomer, namely a non cross-linked and non functionalized elastomer, and 0.01% and 6%, more particularly 0.05% to 3% of a cross-linking agent and/or a functionalization agent, while operating at temperatures ranging between 100° C. and 230° C., preferably between 130° C. and 200° C. and while stirring for at least 5 minutes.

Preferably, in this first form of implementation, initially the precursor elastomer in put in contact with non oxidized and the oxidized bitumens while working at temperatures that range between 100° C. and 230° C., preferably between 130° C. and 200° C., and while stirring for a period of time ranging between 5 minutes and 8 hours, in particular between 30 minutes and 6 hours, to form a homogenous mixture, then the cross-linking agent and/or functionalization agent is added to said mixture in an appropriate quantity chosen within the previously defined ranges for said quantity, and it is all kept under agitation at temperatures ranging between 100° C. and 230° C., preferably between 130° C. and 200° C., that are identical or not to the temperatures at which the precursor elastomer is mixed with the non oxidized and oxidized bitumens that form the bituminous matrix, for a period ranging between 5 minutes and 5 hours, more particularly between 10 minutes and 180 minutes, to form a reaction product that constitutes the cross-linked and/or functionalized bitumen/polymer composition.

According to a second form of implementation, the method for preparing cross-linked and/or functionalized bitumen/polymer compositions consists, in a first phase, in preparing a concentrate by putting between 50% and 100% of non oxidized bitumen making up the composition of the bituminous matrix, with, by weight of said matrix, 5% to 30% of the precursor elastomer and 0.01% to 6%, and more particularly 0.05% to 3%, of a cross-linking agent and/or a functionalization agent, while operating at temperatures ranging between 100° C. and 230° C., preferably between 130° C. and 200° C. under agitation for at least 5 minutes, to form a cross-linked and/or functionalized bitumen/polymer reaction product, then, in a second phase, in diluting the cross-linked and/or functionalized bitumen/polymer reaction product that resulted from the first phase, by incorporating into it the oxidized bitumen and the possible remaining cut of non oxidized bitumen, while operating at temperatures ranging between 100° C. and 230° C., preferably between 130° C. and 200° C., and stirring, to form the cross-linked and/or functionalized bitumen/polymer composition.

Preferably, the first phase of this second form of implementation is implemented by first putting the precursor bitumen in contact with the non oxidized bitumen, while operating at temperatures ranging between 100° C. and 230° C., preferably between 130° C. and 200° C., and stirring for a period of time ranging between 5 minutes and 8 hours, in particular between 30 minutes and 6 hours, to form a homogenous mixture, then incorporating the cross-linking agent and/or functionalization agent into said mixture, in an appropriate quantity chosen from among the previously defined ranges for said quantity, and while still stirring it all and keeping it at temperatures ranging between 100° C. and 230° C., preferably between 130° C. and 200° C., and identical or not to the temperatures at which the precursor elastomer is mixed with the non oxidized bitumen, for a period of time ranging between 5 minutes and 5 hours, more particularly between 10 minutes and 180 minutes, to form the cross-linked and/or functionalized bitumen/polymer reaction product.

The cross-linking agent used in the above-mentioned forms of implementation to form the cross-linked elastomer within the bituminous matrix from the precursor elastomer, may alternatively be a cross-linking agent of the sulfur donor type or a cross-linking agent of the peroxygen compound type that generates free radical at temperatures ranging between 100° C. and 230° C.

The crosslinking sulfur donor agent may consist of a product chosen from the group that includes elementary sulfur, hydrocarbyl polysulfides, sulfur donor vulcanization accelerators, mixtures of said products together and/or with non sulfur donor vulcanization accelerators. In particular, the sulfur donor cross-linking agent can be chosen from among the M products that contain, by weight, from 0% to 100% of a CA component consisting of one or several sulfur donor vulcanization accelerators and from 100% to 0% of a CB component consisting of one or several vulcanization agents chosen from among elementary sulfur and hydrocarbyl polysulfides, and the N products, that contain a CC component consisting of one or several non sulfur donor vulcanization accelerators and an M product in a weight ratio of the CC component to the M product that ranges between 0.01 and 1 and preferably between 0.05 and 0.5.

The elemental sulfur likely to be used to make part or all the cross-linking agent is advantageously elemental sulfur and preferably crystallized sulfur in the orthorhombic form and known under the name of alpha sulfur.

The hydrocarbyl polysulfides likely to be used to form a part or all of the cross-linking agent can be chosen from among the various hydrocarbyl polysulfides defined in the French patent FR-A-2528439 and include, by preference, the polysulfides with a formula of $R_{11}$—(S)p- $R_{11}$, where $R_{11}$ designates a tertiododecyl, hexadecyl, nonyl, decyl, and —(S)p- represents a divalent grouping formed by linking of p sulfur atoms where p is a whole number between 2 and 5.

When the cross-linking agent contains a sulfur donor vulcanization accelerator, the latter can be chosen, in particular, from among the thiuramn polysulfides, alkylphenol disulfides and disulfides such as morpholine disulfide and caprolactam N,N'-disulfide, that are mentioned in the European patents EP-A-0360656 and EP-A-0409683.

Also, the non sulfur donor vulcanization accelerators that can be used to create the CC component of the cross-linking agents of the N product type can be sulfur compounds chosen from among compounds such as mercaptobenzothiazole and its derivatives, namely metallic thiolate benzothiazole and most of all the benzothiazolesulfenamides, metallic dithiocarbamates and thiuram monosulfides that are defined in the European patents EP-A-0360656 and EP-A-0409683.

Other non sulfur donor vulcanization accelerators, that do not belong to the families defined above, can also be used to create the CC component. Such vulcanization accelerators can be such as diphenyl-1,3 guanidine, diorthotolylguanidine and zinc oxide, where the latter compound may be used in the presence of fatty acid.

Due to its composition, as indicated above, the sulfur donor cross-linking agent can be of the single component type or of the multiple component type, where the cross-linking agent of the multiple component type can be created prior to its use or alternatively produced in situ in the environment in which it must be present. The pre-created cross-linking agent of the multiple component type or of the single component type or the components of the multiple component type cross-linking agent created in situ can be used as they are, for example in a molten state, or in a mixture, for example in a solution or in suspension with a diluent, for example a hydrocarbon compound.

The peroxidized compound that generates free radicals at temperatures ranging between 100° C. and 230° C., that can be used as a cross-linking agent to produce the cross-linked elastomer within the bituminous matrix, can be chosen, namely, from among the dihydrocarbyl peroxides such as, for example, ditertiobutyl peroxide and dicumyl peroxide.

The functionalization agent that is used to produce the functionalized elastomer, preferably within the bituminous matrix, through a reaction with the precursor elastomer, can consist of a product chosen from among carboxylic acids or esters with thiol or disulfide groupings, and in particular from among those of said carboxylic acids or esters that are suggested for this purpose in the WO-A-9714754 document, or from among the thiolcarboxylic acid polyesters, modified or not, and in particular from among those of said polyesters that are suggested for this purpose in the WO-A-9847967 document.

For further details on the implementation of cross-linking or functionalization agents, for the production of the cross-linked or functionalized elastomer within the bituminous matrix, we can refer in particular to the following documents, FR-A-2528439, EP-A-0360656 and EP-A-0409683 as far as the cross-linking agent is concerned, and to WO-A-9714754 and WO-A-9847967 as far as the functionalization agent is concerned, as the content of said documents is incorporated in this description by reference.

In addition to the cross-linked and/or functionalized elastomer, the cross-linked and/or functionalized bitumen/polymer composition as set forth in the invention can also contain one or several additional polymers different from said cross-linked and/or functionalized elastomer, where said additional polymer or polymers are in particular olefinic polymers such as polyethylene, polypropylene, polybutene, polyisobutene, vinyl ethylene/acetate copolymers, ethylene/propylene copolymers, ethylene/acrylate or alkyl methacrylate copolymers, functionalized olefinic polymers bearing epoxy or COOH groupings such as ethylene/acrylate or glycidyl methacrylate copolymers, ethylene/acrylate or alkyl/acrylate methacrylate or glycidyl methacrylate terpolymers and in particular glycidyl methyl/methacrylate ethylene/acrylate terpolymers and ethylene/acrylate or maleic alkyl/anhydride methacrylate terpolymers and in particular maleic butyl/anhydride ethylene/acrylate terpolymers.

The quantity of the additional polymer or polymers in the cross-linked and/or functionalized bitumen/polymer composition can range between 0.3% and 20% and preferably between 0.5% and 10% by overall weight of the bitumen in said composition.

The possible additional polymer(s) are advantageously incorporated in the bituminous matrix when the precursor elastomer is incorporated into said matrix, prior to the cross-linking or the functionalization.

During its making, between 1% and 40% and more particularly between 2% and 30% by weight of the bitumen of a fluxing agent can be added to the cross-linked and/or functionalized bitumen/polymer composition and can consist in particular of a hydrocarbon oil with a distillation range at atmospheric pressure that is determined in accordance with the ASTM standard D 86-67, ranging between 100° C. and 600° C. and ranging more specifically between 150° C. and 350° C. This hydrocarbon oil, which can among others be a petroleum fraction of aromatic nature, a naphtheno-paraffin-base petroleum fraction, a paraffin-based petroleum fraction, a coal oil or an oil of plant origin, is sufficiently "heavy" to limit the evaporation when it is added to the bitumen and also sufficiently "light" to be eliminated as much as possible after spreading the bitumen/polymer composition in which it is contained, so as to once again find the same mechanical properties that the bitumen/polymer composition prepared without the use of a fluxing agent has after being spread when hot. The fluxing agent can be added to the environment that is created from the bitumen, the precursor elastomer and, if necessary, the possible additional polymer(s) and the cross-linking agent and/or the functionalization agent, at any time during the making of said environment, with the quantity of fluxing agent being chosen, within the ranges defined above, to be compatible with the final sought use at the work site.

During its formation, the reaction product that makes up the functionalized bitumen/polymer composition, can advantageously be added, while operating at temperatures ranging between 100° C. and 230° C. and more specifically between 130° C. and 200° C., with one or several additives likely to react with the functional groups, for example the carboxylic acids or esters carried by the functionalized elastomer and possibly by the bitumen of the functionalized bitumen/polymer composition, to activate or strengthen the link between the macromolecular links of said functionalized elastomer and/or between said macromolecular links and the bitumen and thus strengthen the physicomechanical properties of the functionalized bitumen/polymer composition. In particular, these reactive additives can be amines, namely primary or secondary polyamines, alcohols, namely polyols, aminoalcohols, epoxides, acids, namely polyacids, or alternatively metallic compounds. Examples of such appropriate additives are given, in particular, in documents WO-A-9714754 and WO-A-9847967.

The quantity of the afore-mentioned reactive additive or additives, that is incorporated into the reaction environment to give birth to the functionalized bitumen/polymer compositions, can go from 0.01% to 10% and more particularly from 0.05% to 5% by weight of bitumen present in said reaction environment.

We can also incorporate additives conventionally used in cross-linked and/or functionalized bitumen/polymer compositions such as promoters of adhesion of the cross-linked and/or functionalized bitumen/polymer composition to mineral surfaces of loads such as French chalk, carbon black, used tires reduced to powder, to the environment that produces the cross-linked and/or functionalized bitumen/polymer compositions at any time during the making of said environment.

In one form of implementation of the production of the cross-linked and/or functionalized bitumen/polymer composition that uses a hydrocarbon oil such as defined above, as a fluxing agent, the precursor elastomer, the possible additional polymer(s) and, if so desired, the cross-linking agent and/or the functionalization agent are incorporated in the bitumen in the form of a mother solution of these products in the hydrocarbon oil that makes up the fluxing agent.

The mother solution is prepared by putting the ingredients of which it is made in contact with each other, namely hydrocarbon oil serving as a solvent, precursor elastomer, and if present, additional polymer(s) and cross-linking agent and/or functionalized agent, under agitation, at temperatures that range between 10° C. and 170° C. and more specifically between 40° C. and 120° C., for a sufficient period of time, for example ranging between 10 minutes and 2 hours, to obtain a full dissolution of the polymeric ingredients and the cross-linking agent and/or the functionalization agent in the hydrocarbon oil.

The respective concentrations of the precursor elastomer and, if present, the additional polymer(s) and the cross-linking agent and/or the functionalization agent, in the mother solution, can vary quite largely based, in particular, on the nature of the hydrocarbon oil used to dissolve said polymer ingredients and the cross-linking agent and/or functionalization agent. Advantageously, the mother solution contains a quantity of precursor elastomer that represents between 5% and 40% and more specifically between 10% and 30% of the weight of the hydrocarbon oil. When present in the mother solution, the cross-linking agent and/or functionalization agent, is used in a quantity ranging, in particular, between 0.05% and 15% and more particularly between 0.1% and 8% of the weight of the hydrocarbon oil.

To prepare the cross-linked and/or functionalized bitumen/polymer compositions or the cross-linked and/or functionalized bitumen/polymer concentrates using the mother solution technique, we mix the mother solution that contains the precursor elastomer and, if used, the additional polymers and the cross-linking agent and/or functionalization agent with the bitumen at temperatures ranging between 100° C. and 230° C., more specifically between 130° C. and 200° C. while stirring, this being done, for example, by incorporating the mother solution to the bitumen still being stirred, at temperatures between 100° C. and 230° C. and more specifically between 130° C. and 200° C., then we keep stirring the mixture resulting therefrom and keep it at temperatures ranging between 100° C. and 230° C. and more specifically between 130° C. and 200° C., for example at the temperatures used to make the mixture of the mother solution and the bitumen, for at least 5 minutes, and generally between 10 minutes and 2 hours, to create a product that makes the cross-linked and/or functionalized bitumen/polymer composition or the cross-linked and/or functionalized bitumen/polymer concentrate.

The quantity of mother solution mixed with the bitumen is chosen to provide the desired quantities, in relation to the bitumen, of precursor elastomer, additional polymer(s) and cross-linking agent and/or functionalization agent, where said quantities fall in the ranges as previously defined.

Immediately after obtaining it, the cross-linked and/or functionalized bitumen/polymer composition, produced by the method as set forth in the invention, can be subjected to a treatment using an acid adjuvant, for example made of at least one acid chosen from among phosphoric acid, sulfuric acid, polyphosphoric acids, sulfonic acids, and phosphonic acids, as described in the documents WO-A-9528446 and WO-A-9714753.

The cross-linked and/or functionalized bitumen/polymer compositions produced as set forth in the invention can be used as bituminous binders, either directly or after an aqueous emulsion, to make pavements and in particular road surface treatments, namely of the sealing coat type, for the making of coated materials that are spread when hot or cold, or alternatively to make watertight facings.

The invention is illustrated in the following examples given for informational purposes only and not to be considered limiting.

In these examples, the quantities and percentages are expressed by weight unless otherwise noted.

Furthermore, the rheological and mechanical properties of the bitumens or the bitumen/polymer compositions to which we refer in said examples, namely penetrability, ring and ball softening point and PFEIFFER number (PN), are those that have been previously defined.

EXAMPLES 1 THROUGH 9

We prepared control cross-linked bitumen/polymer compositions (examples 1 through 3), as well as cross-linked bitumen/polymer compositions as set forth in the invention (examples 4 through 7) to evaluate and compare the physicomechanical properties.

We worked under the following conditions:

Example 1 (Control)

In a reactor held at 180° C. and under agitation, we introduced 964 parts of a straight-run bitumen with a penetrability, determined based on the provisions of the NF standard T 66004, equal to 55 and 35 parts of diblock of styrene and of butadiene with a molecular mass by weight equal to 125 000 Daltons and containing, by weight, 25% of styrene and 75% of butadiene. The content of the reactor was then kept at 180° C. under agitation for a period of time equal to 2 hours to form a homogenous mass. We then added 1 part of sulfur as a cross-linking agent to said mass and kept the reaction environment so created at 180° C., under agitation, for 2 hours to produce a control cross-linked bitumen/polymer composition.

Example 2 (Control)

We prepared a cross-linked bitumen/polymer composition working as described in example 1, using however 948 parts of bitumen, 50 parts of the diblock copolymer of styrene and of butadiene and 2 parts of sulfur.

Example 3 (Control)

We prepared a cross-linked bitumen/polymer concentrate working as follows:

In a reactor held at 180° C. and under agitation, we incorporated 15 parts of a resin acid that contained 50% of active matter, to 863 parts of a straight-run bitumen whose penetrability was determined as set forth in the provisions of the NF standard T 66004, equal to 190 and kept the mixture so obtained at said temperature for 20 minutes.

Still working at a temperature of 180° C., we then incorporated, under agitation, 120 parts of a diblock copolymer of styrene and of butadiene identical to that used in example 1 to the bitumen and resin acid mix. The content of the reactor was then kept at 180° C. under agitation for a period of time equal to 2 hours to produce a homogenous mass. To said mass we then added 2 parts of sulfur, as a cross-linking agent, and kept the reaction environment thus created at 180° C., under agitation, for 2 hours to produce a control cross-linked bitumen/polymer concentrate. Said concentrate had a penetrability of 96, a ring and ball softening point of 84° C. and a Pfeiffer number of 6.85.

We then diluted said concentrate with a straight-run bitumen with a penetrability of 27 and a ring and ball softening point (RBT) of 58.5° C., while mixing for 20 minutes, at 180° C. and under agitation, 30 parts of the concentrate and 70 parts of the straight-run bitumen, to obtain a diluted cross-linked bitumen/polymer composition that contained 3.6% of cross-linked block copolymer.

Example 4 (As Set Forth in the Invention)

We prepared a cross-linked bitumen/polymer composition working as described in example 1, replacing however the bitumen used with a mixture of 420 parts of a straight-run bitumen, with a penetrability ranging between 180 and 220, and 544 parts of an oxidized bitumen of the semi-blown type, with a penetrability ranging between 20 and 30, and a ring and ball softening point (RBT) ranging between 75 and 85° C.

Example 5 (As Set Forth in the Invention)

We prepared a cross-linked bitumen/polymer composition working as described in example 1, replacing however the bitumens used with a mixture of 617 parts of a straight-run bitumen, with a penetrability ranging between 180 and 220, and 347 parts of an oxidized bitumen of the semi-blown type, with a penetrability of 40 and a ring and ball softening point (RBT) of 100° C.

Example 6 (As Set Forth in the Invention)

We prepared a cross-linked bitumen/polymer composition, playing the role of a concentrate, working as described in example 1, replacing however the bitumen with 923 parts of straight-run bitumen with a penetrability ranging between 180 and 220 and using 75 parts of the diblock copolymer of styrene and of butadiene and 2 parts of sulfur.

We then diluted the concentrate obtained with an oxidized bitumen of the semi-blown type with a penetrability ranging between 20 and 30 and a ring and ball softening point (RBT) ranging between 75 and 85° C. To do so, we mixed said concentrate for 20 minutes, at 180° C. and under agitation, with 952 parts of oxidized bitumen, to obtain a diluted cross-linked bitumen/polymer composition that contained 4% of cross-linked block copolymer.

Example 7 (As Set Forth in the Invention)

We prepared a cross-linked bitumen/polymer concentrate, working as described in example 3. Said concentrate had a penetrability of 96, a ring and ball softening point (RBT) of 84° C. and a Pfeiffer number of 6.85.

We then diluted the concentrate obtained with a mixture of bitumens made of 75% of a straight-run bitumen, with a penetrability of 27 and a ring and ball softening point (RBT) of 58.5° C. and 25% of an oxidized bitumen of the semi-blown type with a penetrability of 40 and a ring and ball softening point (RBT) of 101° C. The dilution was done by mixing 30 parts of said concentrate with 70 parts of the bitumen mixture for 20 minutes, at 180° C. under agitation; the diluted cross-linked bitumen/polymer composition obtained contained 3.7% of cross-linked block copolymer.

For each of the compositions prepared as indicated in examples 1 through 7, we determined the following properties:

penetrability at 25° C. (Pen)
ring and ball softening point (RBT)
PFEIFFER number (PN)

The results obtained are provided in the following table.
The polymer content of the compositions is expressed in weight percentages of the overall amount of bitumen.

TABLE

| Examples | | | | | | | |
|---|---|---|---|---|---|---|---|
| Copolymer in the final composition (% of overall bitumen) | 3.6 | 5.3 | 3.75 | 3.6 | 3.6 | 4 | 3.75 |
| Oxidized bitumen in the final composition (% of overall bitumen) | 0 | 0 | 0 | 56.5 | 36 | 50.8 | 18.4 |
| Pen (1/10 mm) | 46 | 46 | 35 | 45 | 30 | 58 | 48 |
| RBT (° C.) | 61 | 68 | 60.5 | 69.2 | 80 | 69.4 | 63 |
| PN | 1.0 | 2.3 | 0.29 | 2.4 | 3.1 | 3.1 | 1.5 |

In view of the properties in the above table, its seems that:
replacement of a part of the non oxidized bitumen with oxidized bitumen in the cross-linked bitumen/polymer composition is translated by an improvement of the physical properties of said compositions and in particular by an increase of the ring and ball softening point (RBT) and of the Pfeiffer number, whether the oxidized bitumen is present during the preparation of the cross-linked bitumen/polymer compositions (compare the results in the control example 1 with those of examples 4 and 5 as set forth in the invention) or whether it is only used during the dilution of the cross-linked bitumen/polymer concentrates (compare the results of the control example 3 with those of example 7 as set forth in the invention), to produce the cross-linked bitumen/polymer compositions;

replacement of a part of the non oxidized bitumen with oxidized bitumen in the cross-linked bitumen/polymer compositions makes it possible, with comparable properties of penetrability, ring and ball softening point (RBT) and Pfeiffer number, to reduce the composition's content of cross-linked polymer (compare the results of the control example 2 with those of the example 4 as set forth in the invention).

What is claimed is:

1. A method for preparing a cross-linked and/or functionalized bitumen/polymer composition having a low susceptibility to temperature, comprising;
   forming, at temperatures in the range between 100° C. and 230° C., and under agitation, a homogenous mass comprising a bituminous matrix in which is uniformly dispersed a precursor elastomer, and
   cross-linking and/or functionalizing said precursor elastomer to form said cross-linked and/or functionalized bitumen/polymer composition,
   wherein said precursor elastomer is used in a quantity of between 0.5% and 30% of the weight of the bituminous matrix,
   and said bituminous matrix is made by associating, by weight, x % of a non oxidized bitumen with a penetrability of between 20 and 900 and y % of an oxidized bitumen, with a penetrability of between 10 and 90, where said penetrabilities are determined as set forth the in NF standard T 66004 and are expressed in $\frac{1}{10}$ mm, where the values of x and y are such that $20 \leq x \leq 95$ and $5 \leq y \leq 80$ with x+y=100.

2. The method as set forth in claim 1, wherein the values of x and y are such that $35 \leq x \leq 85$ and $15 \leq y \leq 65$ with x+y=100.

3. The method as set forth in claim 1, wherein the quantity of the precursor elastomer is from 1.5% to 20% of the weight of the bituminous matrix.

4. The method as set forth in claim 1, wherein the non oxidized bitumen consists of one single bitumen or a mixture of bitumens selected from the group consisting of straight-run bitumens, refinery bitumens under reduced pressure, propane or pentane deasphalting residues and viscosity breaking residues.

5. The method as set forth in claim 4, wherein the non oxidized bitumen is one bitumen or a mixture of straight-run bitumens.

6. The method as set forth in claim 1, wherein the oxidized bitumen consists of one single oxidized bitumen or of a mixture of oxidized bitumens selected from the group consisting of blown bitumens and semi-blown bitumens.

7. The method as set forth in claim 1, wherein the penetrability of the non oxidized bitumen is between 35 and 500.

8. The method as set forth in claim 1, wherein the penetrability of the oxidized bitumen is between 20 and 60.

9. The method as set forth in claim 1, wherein the oxidized bitumen has a ring and ball softening point as defined in the NF standard T 66008 of between 60° C. and 120° C.

10. The method as set forth in claim 1, wherein the precursor elastomer consists of at least one copolymer selected from the group consisting of random and block copolymers of styrene and a conjugated diene.

11. The method as set forth in claim 10, wherein the precursor elastomer consists of one or more copolymers selected from the group consisting of linear and star block copolymers, with or without a random hinge, of styrene and butadiene, of styrene and isoprene, of styrene and chloroprene, of styrene and carboxylic butadiene or of styrene and carboxylic isoprene.

12. The method as set forth in claim 10, wherein the copolymers of styrene and conjugate diene have a styrene content of between 5% and 50% by weight.

13. The method as set forth claim 10, wherein the copolymers of styrene and conjugated diene have, prior to the cross-linking and/or functionalization, a weight average molecular weight of between 10 000 daltons and 600 000 daltons.

14. The method as set forth in claim 1, wherein the non oxidized bitumen and the oxidized bitumen are contacted with, by weight of said bituminous matrix, 0.5% to 30% of the precursor elastomer and 0.01% to 6% of a cross-linking agent and/or a functionalization agent while working at temperatures of between 100° C. and 230° C. and under agitation for a period of time of at least 5 minutes.

15. The method as set forth in claim 14, wherein the precursor elastomer is contacted with the non oxidized and the oxidized bitumens while working at temperatures of between 100° C. and 230° C. and under agitation for a period of time of from 5 minutes to 8 hours, to create a homogenous mixture, then incorporating the cross-linking agent and/or functionalization agent into said mixture while under agitation at temperatures of between 100° C. and 230° C., for a period of time of between 5 minutes and 5 hours, to form a reaction product that makes up the cross-linked and/or functionalized bitumen/polymer composition.

16. The method as set forth in claim 1, comprising, in a first phase, preparing a concentrate by contacting 50% to 100% of the non oxidized bitumen with, by weight of said bituminous matrix, 5% to 30% of the precursor elastomer and 0.01% to 6% of a cross-linking agent and/or a functionalization agent to form a cross-linked and/or functionalized bitumen/polymer reaction product that makes up said concentrate while working at temperatures of between 100° C. and 230° C. under agitation during a period of time of at least 5 minutes and then, in a second phase, diluting the cross-linked and/or functionalization bitumen/polymer reaction that resulted from the first phase and adding to it the oxidized bitumen and the possible remaining fraction of non oxidized bitumen, while operating at temperatures of between 100° C. and 230° C., under agitation, to form the cross-linked and/or functionalized bitumen/polymer composition.

17. The method as set forth in claim 16, wherein the first phase is carried out by contacting the precursor elastomer with the non oxidized bitumen, while working at temperatures of between 100° C. and 230° C., and under agitation for a period of time from 5 minutes to 8 hours, to form a homogenous mass, then in adding to said homogenous mass the cross-linking agent and/or the functionalization agent and holding it all under agitation temperatures of between 100° C. and 230° C., for a period of time of from 5 minutes to 5 hours, to form the cross-linked and/or functionalized bitumen/polymer reaction product.

18. The method as set forth in claim 14, wherein the precursor elastomer is functionalized within the bituminous matrix with a functionalization agent selected from the group consisting of carboxylic acids or esters bearing thiol or disulfide groups and thiolcarboxylic acid polyesters.

19. The method as set forth in claim 1, wherein the precursor elastomer is functionalized and one or more reactive additives likely to react with the functional groups of the elastomer are incorporated into the functionalized bitumen/polymer composition during its preparation where the quantity of the reactive additive(s) is from 0.01% to 10% of the weight of the bitumen present in the composition.

20. The method as set forth in claim 14, wherein the precursor elastomer is cross-linked within the bituminous matrix, using a cross-linking agent selected from the group consisting of a sulfur donor cross-linking agent and a peroxidized that generates a free radical at temperatures of between 100° C. and 230° C.

21. The method as set forth in claim 1, further incorporating one or more additional polymer that are different from the precursor elastomer to the cross-linked and/or functionalized bitumen/polymer composition in an overall amount of between 0.3% and 20% of the weight of the bitumen of said compositions.

22. A road surface pavement or a watertight facing made from a cross-linked and/or functionalized bitumen/polymer composition made from the method of claim 1.

23. The method as set forth in claim 7, wherein the penetrability of the non oxidized bitumen is between 160 and 330.

24. The method as set forth claim 13, wherein the copolymers of styrene and conjugated diene have, prior to the cross-linking and/or functionalization, a weight average molecular weight of between 30 000 daltons and 400 000 daltons.

25. The method as set forth in claim 14, wherein the non oxidized bitumen and the oxidized bitumen are contacted with, by weight of said bituminous matrix, 1.5% to 20% of the precursor elastomer and 0.05% to 3% of cross-linking agent and/or a functionalization agent while working at temperatures of between 130° C. and 200° C. and under agitation for a period of time of at least 5 minutes.

26. The method as set forth in claim 15, wherein the precursor elastomer is put in contact with the non oxidized and the oxidized bitumens while working at temperatures of between 130° C. and 200° C. and under agitation for a period of time ranging from 30 minutes to 6 hours, to create a homogenous mixture, then the cross-linking agent and/or functionalization agent is incorporated into said mixture while under agitation at temperatures of between 130° C. and 200° C., for a period of time between 10 minutes and 180 minutes, to form a reaction product that makes up the cross-linked and/or functionalized bitumen/polymer composition.

27. The method as set forth in claim 16, comprising, in the first phase, preparing a concentrate by contacting from 50% to 100% of the non oxidized bitumen with, by weight of said bituminous matrix, 5% to 30% of the precursor elastomer and 0.05% to 3%, of a cross-linking agent and/or a functionalization agent to form a cross-linked and/or functionalized bitumen/polymer reaction product that makes up said concentrate while working at temperatures of between 130° C. and 200° C., under agitation during a period of time of at least 5 minutes and then, in the second phase, diluting the cross-linked and/or functionalization bitumen/polymer reaction that resulted from the first phase and adding to it the oxidized bitumen and the possible remaining fraction of non oxidized bitumen, while operating at temperatures of between 130° C. and 200° C., under agitation, to form the cross-linked and/or functionalized bitumen/polymer composition.

28. The method as set forth in claim 17, wherein the first phase is carried out by contacting the precursor elastomer with the non oxidized bitumen, while working at temperatures of between 130° C. and 200° C., and under agitation for a period of time from 30 minutes to 6 hours, to form a homogenous mass, then in adding to said homogenous mass the cross-linking agent and/or the functionalization agent and holding it all under agitation at temperatures of between 130° C. and 200° C., for a period of time of from between 10 minutes and 180 minutes, to form the cross-linked and/or functionalized bitumen/polymer reaction product.

29. The method as set forth in claim 19, wherein the elastomer is functionalized and one or several reactive additives likely to react with the functional groupings of the elastomer are incorporated into the functionalized bitumen/polymer composition during its preparation where the quantity of the reactive additive(s) ranges from 0.05% to 5% of the weight of the bitumen present in the composition.

30. The method as set forth in claim 10, wherein the present elastomer consists of at least one copolymer selected from the group consisting of random and block copolymers of styrene and butadiene, isoprene, chloroprene, carboxylic butadiene or carboxylic isoprene.

* * * * *